United States Patent
Saigusa

(10) Patent No.: US 11,294,608 B2
(45) Date of Patent: Apr. 5, 2022

(54) SERVER SYSTEM AND INFORMATION PROCESSING APPARATUS

(71) Applicant: CANON KABUSHIKI KAISHA, Tokyo (JP)

(72) Inventor: Hirokazu Saigusa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/935,989

(22) Filed: Jul. 22, 2020

(65) Prior Publication Data

US 2021/0055893 A1 Feb. 25, 2021

(30) Foreign Application Priority Data

Aug. 21, 2019 (JP) .............................. JP2019-151408

(51) Int. Cl.
*G06F 3/12* (2006.01)
*H04L 67/10* (2022.01)
*H04L 67/02* (2022.01)

(52) U.S. Cl.
CPC .......... *G06F 3/1208* (2013.01); *G06F 3/1254* (2013.01); *G06F 3/1288* (2013.01); *H04L 67/02* (2013.01); *H04L 67/10* (2013.01)

(58) Field of Classification Search
None
See application file for complete search history.

(56) References Cited

U.S. PATENT DOCUMENTS

| 2015/0178031 | A1* | 6/2015 | Kanamori | G06F 3/1288 |
| | | | | 358/1.15 |
| 2017/0026549 | A1* | 1/2017 | Masuda | H04N 1/00204 |
| 2017/0039008 | A1* | 2/2017 | Saito | G06F 3/1239 |
| 2017/0161289 | A1* | 6/2017 | Ignatowicz | G06Q 40/06 |
| 2019/0289165 | A1* | 9/2019 | Yoshimi | H04L 41/12 |

FOREIGN PATENT DOCUMENTS

JP 2016-015096 A 1/2016

* cited by examiner

*Primary Examiner* — Frantz Bataille
(74) *Attorney, Agent, or Firm* — Canon U.S.A., Inc. IP Division

(57) ABSTRACT

A server system is communicable with an image forming apparatus and an information processing apparatus, and includes a first reception unit configured to receive image data generated by a first application, a transmission unit configured to transmit, to the information processing apparatus, information to activate a second application that enables a user to perform print setting used in printing of the image data received by the first reception unit, a second reception unit configured to receive the print setting performed in the second application, and a print control unit configured to cause the image forming apparatus to perform printing based on at least the image data received by the first reception unit and the print setting received by the second reception unit.

39 Claims, 12 Drawing Sheets

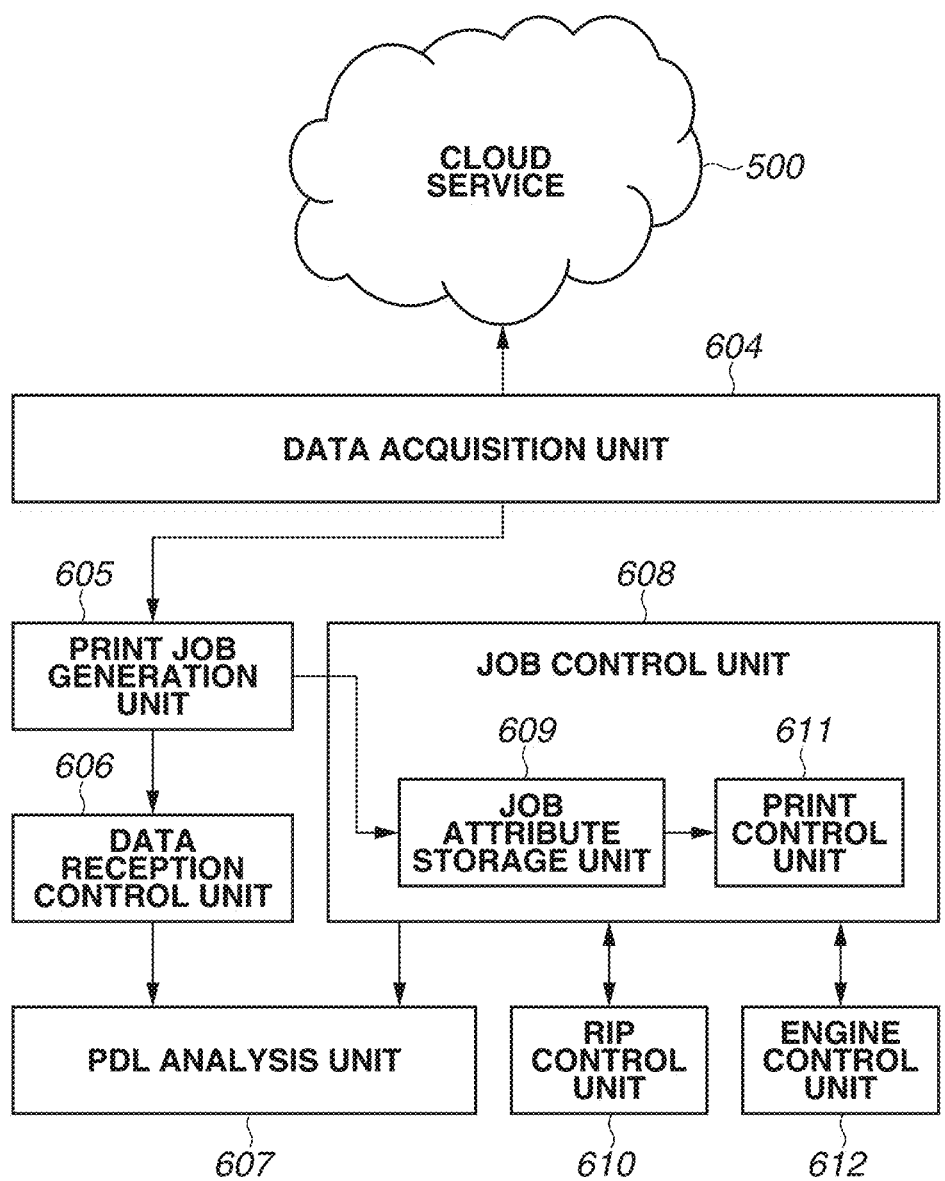

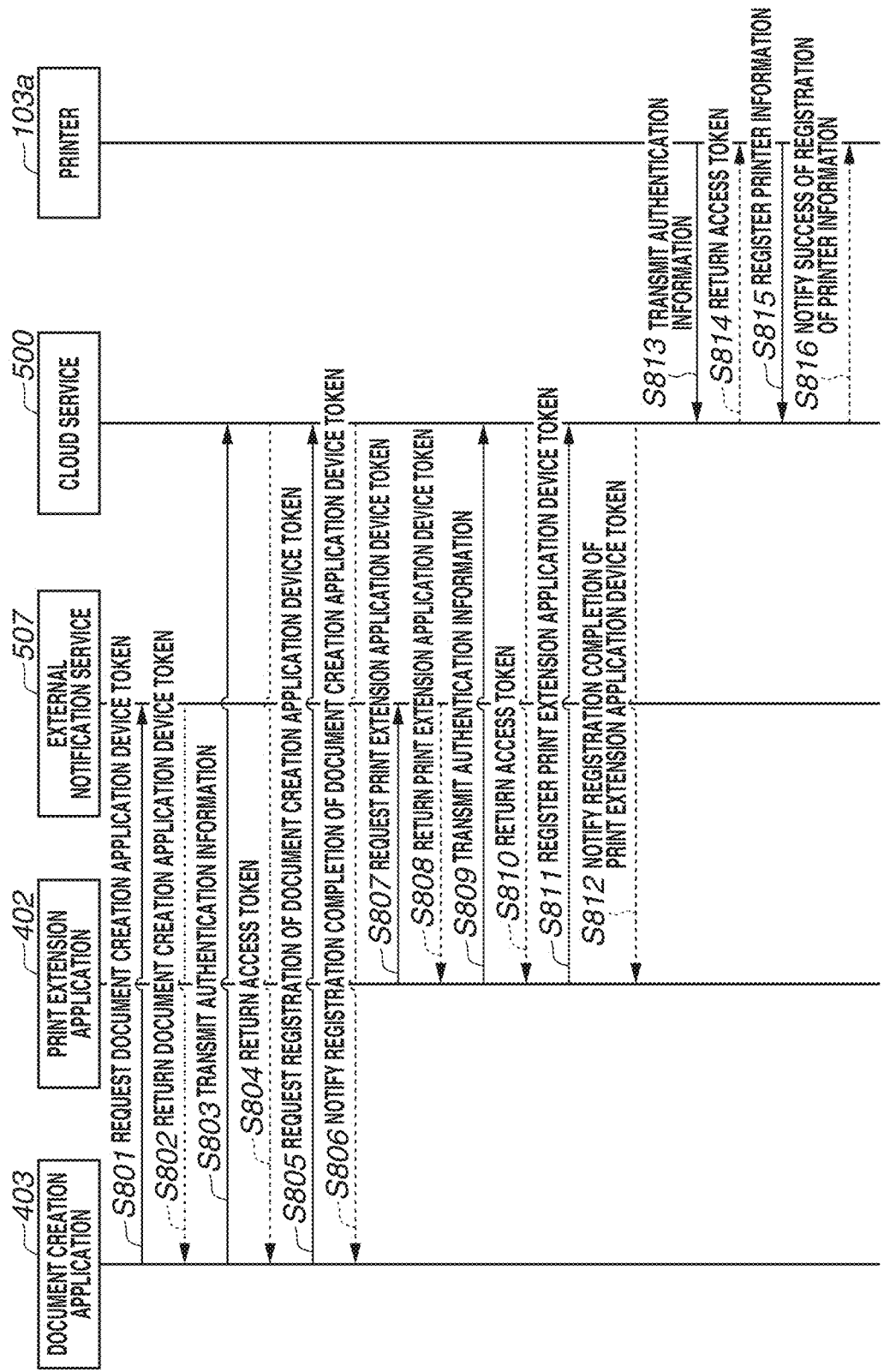

SERVER SYSTEM AND INFORMATION PROCESSING APPARATUS

BACKGROUND

Field of the Disclosure

The present disclosure relates to a server system and an application.

Description of the Related Art

To print image data generated by a personal computer (PC) or a terminal such as a tablet, the user performs print setting by using a printer driver corresponding to an image forming apparatus used for printing. The printer driver generates print data reflecting the set print setting, and transmits the print data to the image forming apparatus.

On the other hand, in an operating system (OS) or a generic print service provided by a server apparatus on a cloud, the user performs print setting via a print setting screen provided by the OS or the print service. Further, the terminal registers image data and the print setting with the cloud. For example, in a technique discussed in Japanese Patent Application Laid-Open No. 2016-15096, a print job generated by a client terminal is accumulated for each user in a server. When the user logs in to an image forming apparatus, the image forming apparatus acquires the print job of the login user accumulated in the server, and performs printing.

In the above-described generic print service, printers of various models provided by various vendors are used for printing. In the print setting screen provided by the print service, functions executable by any printer used by the user are settable in order to enable the user to perform printing in any printer. Accordingly, there is a function not settable in the print setting screen provided by the print service even though the function is executable by the image forming apparatus used for printing by the user.

SUMMARY

Embodiments of the present disclosure are directed to providing a print setting screen adapted to an image forming apparatus used for printing in a print service that is usable irrespective of a model and a vendor of the image forming apparatus.

According to embodiments of the present disclosure, a server system is communicable with an image forming apparatus and an information processing apparatus, and includes a first reception unit configured to receive image data generated by a first application installed in the information processing apparatus, a transmission unit configured to transmit, to the information processing apparatus, information to activate a second application that enables a user to perform print setting used in printing of the image data received by the first reception unit, a second reception unit configured to receive the print setting performed in the second application, and a print control unit configured to cause the image forming apparatus to perform printing based on at least the image data received by the first reception unit and the print setting received by the second reception unit.

Further features of the present disclosure will become apparent from the following description of exemplary embodiments with reference to the attached drawings.

BRIEF DESCRIPTION OF THE DRAWINGS

FIG. 6 is a diagram illustrating an example of a software configuration of the printer according to the present exemplary embodiment.

FIG. 8 is a sequence diagram of a printing flow according to the present exemplary embodiment.

DESCRIPTION OF THE EMBODIMENTS

Some exemplary embodiments of the present disclosure are described below with reference to drawings. The following exemplary embodiments should not be seen as limiting, and all of combinations of features described in the exemplary embodiments are not necessarily deemed to be essential.

Figure 1:
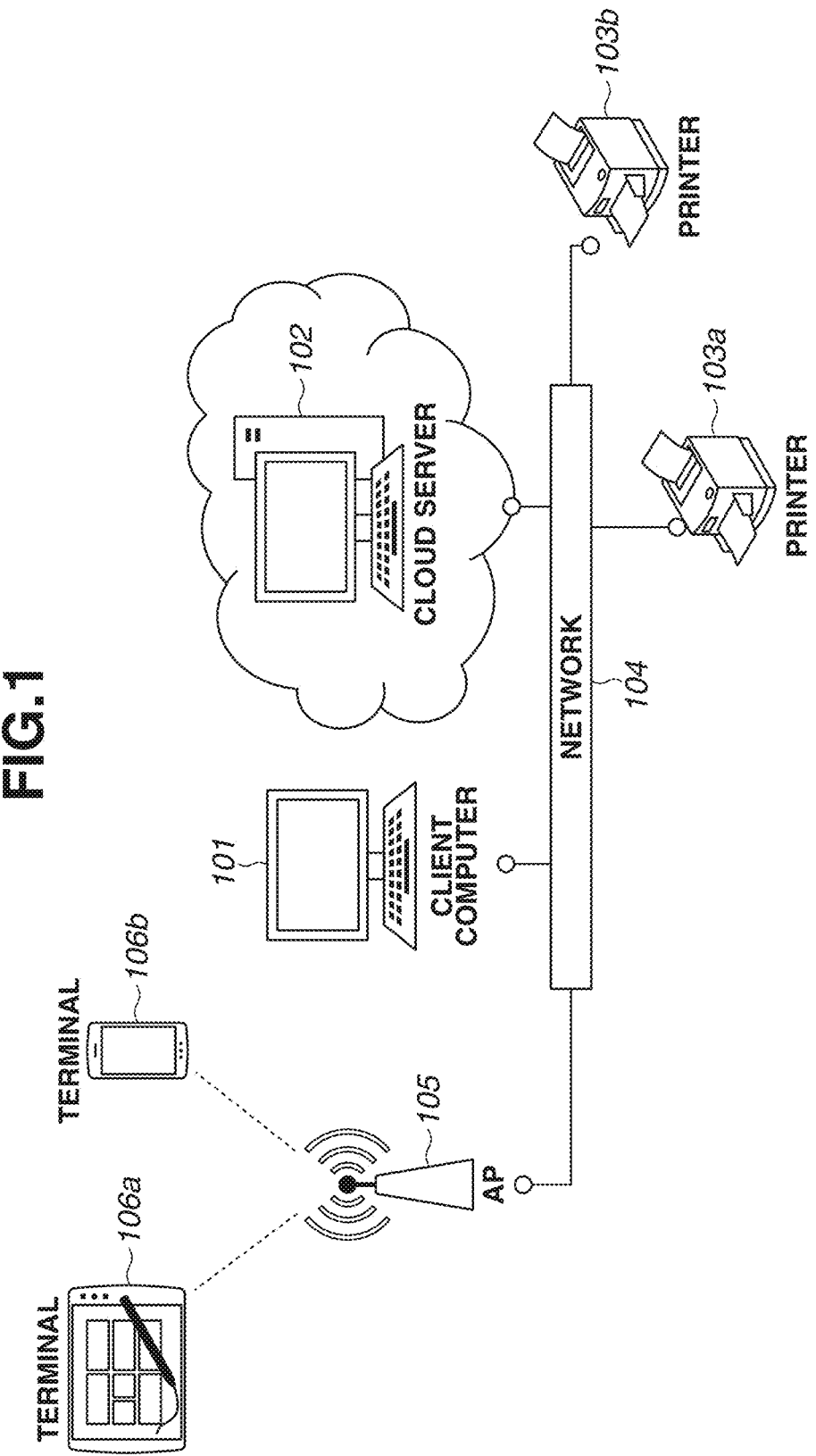
FIG. 1 is a diagram illustrating an example of a printing system according to an exemplary embodiment.

First, a configuration of a printing system according to a first exemplary embodiment will be described with reference to FIG. 1. FIG. 1 is a diagram illustrating an example of the printing system according to the present exemplary embodiment. The printing system according to the present exemplary embodiment includes a client computer 101 and a cloud server 102 that are examples of an information processing apparatus, and printers 103 that receive print data in a page description language (PDL) format and perform printing. A plurality of printers 103a and 103b is connected to a network 104. The apparatuses can communicate with each other via the network 104 including a wide area network (WAN). Further, information processing apparatuses such as a tablet terminal 106a and a smartphone terminal 106b are connected to the network 104 via an access point (AP) 105. Communication via the AP 105 is, for example, wireless communication conforming to Institute of Electrical and Electronics Engineers (IEEE) 802.11 series. The terminals 106 are not limited to the tablet terminal and the smartphone terminal, and may be any other information processing apparatuses.

Further, each of the printer 103a and the printer 103b may be a single-function printer including only a print function, or a multifunction printer including the print function, a scan function, and a copy function. The number of client computers 101 connected to the network 104 is not limited to one, and a plurality of client computers 101 may be connected to the network 104. The client computer 101, the terminal 106a, and the terminal 106b can transmit print data to the printers 103. In FIG. 1, the cloud server 102 is illustrated as a single apparatus, however, the cloud server 102 may be a server system in which a plurality of server apparatuses cooperates with one another to provide a service.

Figure 2:
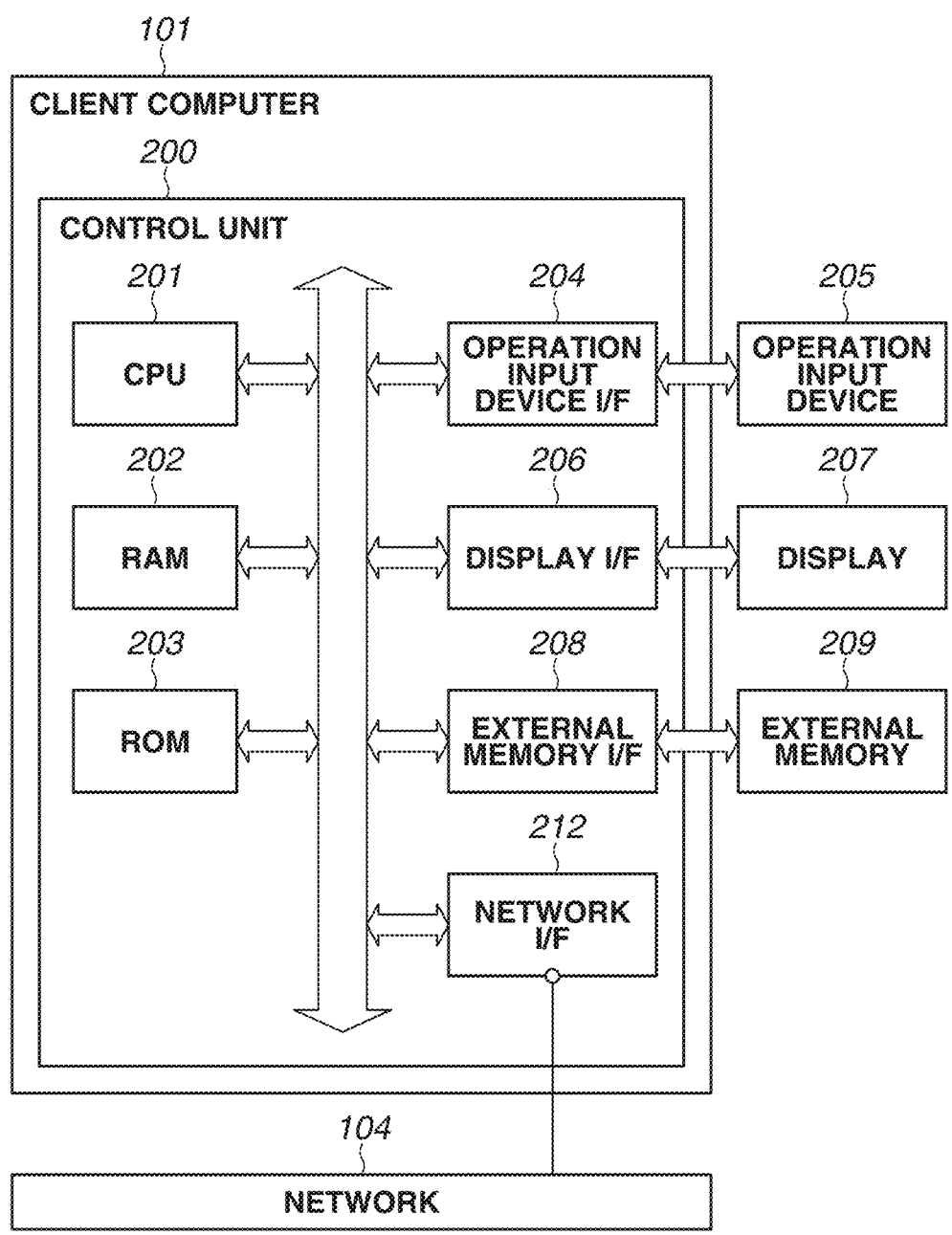
FIG. 2 is a diagram illustrating an example of a hardware configuration of a client computer according to the present exemplary embodiment.

FIG. 2 is a block diagram illustrating a hardware configuration of the client computer 101 in FIG. 1. The client computer 101 includes a central processing unit (CPU) 201, a random access memory (RAM) 202, an external memory 209, and a read only memory (ROM) 203.

A control unit 200 including the CPU 201 controls operation of the whole of the client computer 101. The CPU 201 loads programs stored in the ROM 203 or the external memory 209 to the RAM 202, and executes the programs to perform various kinds of control such as control of a user interface (UI) screen, generation of print data, and transfer of the print data. The ROM 203 stores control programs, a boot program, etc. executable by the CPU 201. The RAM 202 is a main storage memory of the CPU 201, and is used as a work area or a temporary storage area for loading the various kinds of programs. The external memory 209 that is connected to the control unit 200 via an external memory interface (IF) 208 stores applications, an operating system (OS), etc. In the present exemplary embodiment, an auxiliary storage device such as a hard disk drive (HDD) is assumed as the external memory 209, however, a nonvolatile memory such as a solid state drive (SSD) may be used in place of the HDD. As described above, the hardware such as the CPU 201, the RAM 202, the ROM 203, and the external memory 209 forms a computer.

An operation input device FT 204 is an interface that controls an operation input device 205 including a keyboard, a pointing device (mouse), and a touch input device. The operation input device 205 functions as a reception unit receiving operation from a user. A display I/F 206 controls display of a screen on a display 207. The display 207 functions as a display unit displaying information to the user.

The control unit 200 is connected to the network 104 via a network I/F 212. The network I/F 212 transmits print data to a printer on the network 104, and receives an application, a printer driver, etc. from a server on the network 104. Data communication with an external terminal on the network 104 is, for example, wireless communication conforming to IEEE 802.11 series, mobile communication using long term evolution (LTE) and fifth generation mobile communications system (5G), or communication via a wired cable such as a local area network (LAN) cable.

In a case where the cloud server 102 includes a single apparatus, the hardware configuration of the cloud server 102 is the same as the hardware configuration of the client computer 101. In a case where the cloud server 102 is a cloud system including a plurality of apparatuses, the hardware configuration of each of the apparatuses configuring the cloud system is the same as the hardware configuration of the client computer 101. In the case of the terminal 106, the operation input device 205, the display 207, and the external memory 209 are incorporated in the terminal 106, however, the configuration of the other part is the same as the configuration of the client computer 101.

Figure 3:
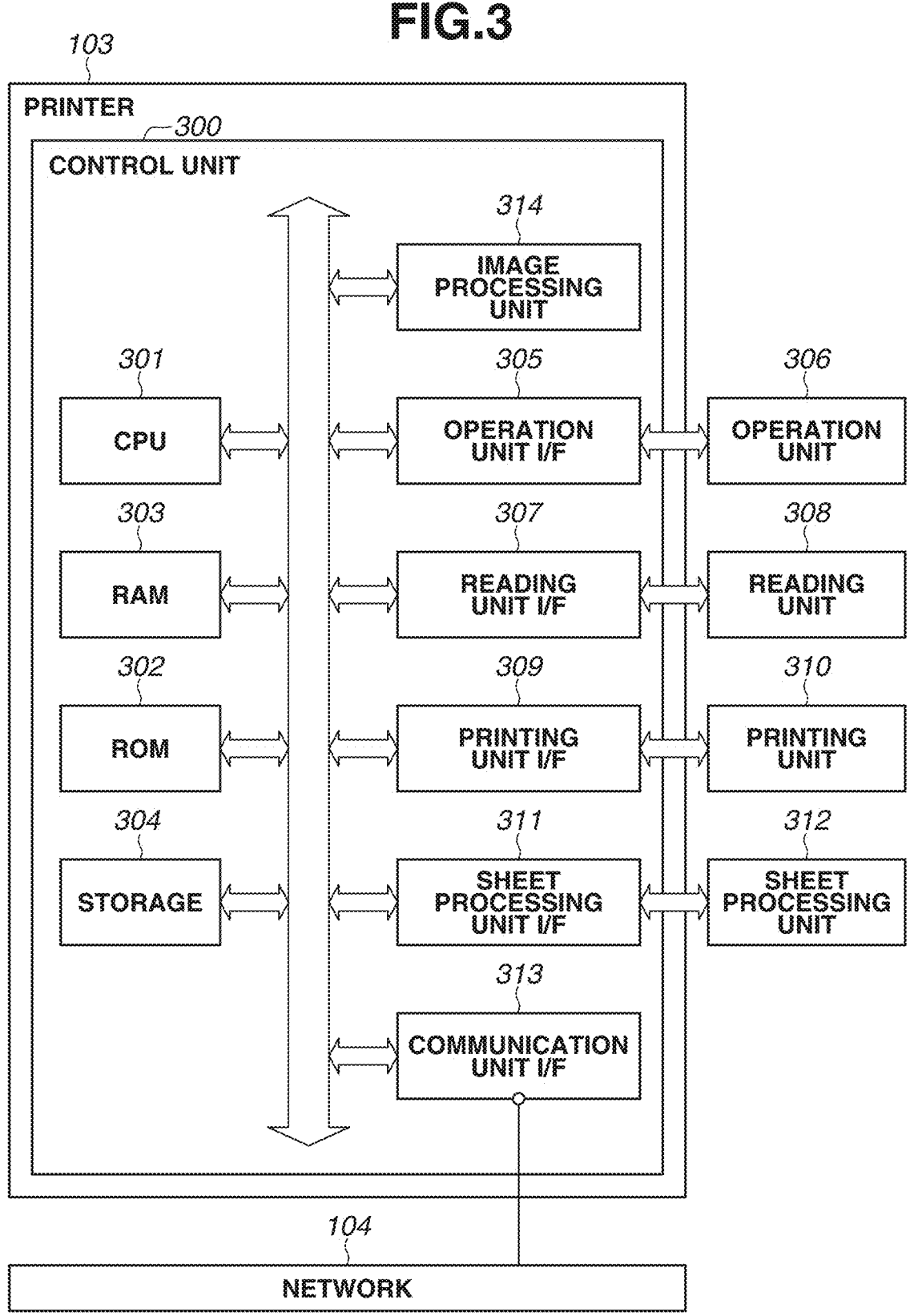
FIG. 3 is a diagram illustrating an example of a hardware configuration of a printer according to the present exemplary embodiment.

FIG. 3 is a block diagram illustrating a hardware configuration of the printer 103a. The printer 103a includes a read function to read an image on a sheet, and a print function to print an image on a sheet. The printer 103 further includes a file transmission function to transmit an image to an external information processing apparatus.

In the present exemplary embodiment, the printer 103a is described as an example of a printing apparatus, however, the printing apparatus is not limited thereto. For example, the printing apparatus may be a single function peripheral (SFP) not including the read function. Further, the printer 103b has the same configuration as the configuration of the printer 103a. Therefore, description of the configuration of the printer 103b will be omitted.

A control unit 300 including a CPU 301 controls operation of the whole of the printer 103a. The CPU 301 reads out control programs stored in a ROM 302 and a storage 304, and performs various kinds of control such as print control and read control. The ROM 302 stores control programs executable by the CPU 301. A RAM 303 is a main storage memory of the CPU 301, and is used as a work area or a temporary storage area for loading the various kinds of control programs. The storage 304 stores print data, image data, various kinds of programs, and various kinds of setting information. In the present exemplary embodiment, an auxiliary storage device such as an HDD is assumed as the storage 304, however, a nonvolatile memory such as an SSD may be used in place of the HDD. As described above, the hardware such as the CPU 301, the ROM 302, and the RAM 303 form a computer.

In the printer 103a according to the present exemplary embodiment, one CPU 301 performs each processing described below using one memory (RAM 303), however, each processing may be performed in any other mode. For example, a plurality of CPUs, RAMs, ROMs, and storages can cooperate with one another to perform each processing described below. Further, a part of processing may be performed by a hardware circuit such as an application specific integrated circuit (ASIC) and a field-programmable gate array (FPGA).

An operation unit I/F 305 connects an operation unit 306 and the control unit 300. The operation unit 306 includes a liquid crystal display unit having a touch panel function and various kinds of hardware keys. The operation unit 306 functions as a display unit displaying information and a reception unit receiving an instruction by the user.

A reading unit I/F 307 connects a reading unit 308 and the control unit 300. The reading unit 308 reads a document to generate a read image. The generated read image is stored in the storage 304 or the RAM 303. The read image generated by the reading unit 308 is transmitted to a communication apparatus, and is used in printing of an image on a sheet.

An image processing unit 314 has a function of a raster image processor (RIP) to develop print data received via a network and to generate a print image. Further, the image processing unit 314 can perform resolution conversion and correction processing of an image. In the present exemplary embodiment, it is assumed that the image processing unit 314 is implemented by a hardware circuit (ASIC or FPGA), however, the image processing unit is not limited thereto. For example, the printer 103 may include a processor for image processing, and the processor for image processing may perform an image processing program to implement image processing and development processing of print data. In this case, the processor for image processing and the CPU 301 cooperate with each other to realize each processing described below. Furthermore, the CPU 301 may execute a program for image processing to perform the image processing and the development processing of the print data. Alternatively, the image processing may be performed by a combination of any thereof.

A printing unit I/F 309 connects a printing unit 310 and the control unit 300. A print image generated as a result of analysis of print data by the image processing unit 314 is transferred from the control unit 300 to the printing unit 310 via the printing unit I/F 309. The printing unit 310 receives a control command and the print image via the control unit 300, and prints an image on a sheet fed from a sheet feeding cassette (not illustrated) based on the print image. A printing method of the printing unit 310 may be an electrophotographic method or an inkjet method. In addition, other printing method such as a thermal transfer method may be adopted. A sheet processing unit I/F 311 connects the control unit 300 and a sheet processing unit 312. The sheet processing unit 312 receives a control command from the CPU 301, and performs postprocessing on sheets printed by the printing unit 310 based on the control command. The sheet processing unit 312 performs the postprocessing such as alignment of a plurality of sheets, punching of the plurality of sheets, and binding of the plurality of sheets. Functions and capabilities of the postprocessing of the sheet processing unit 312 are notified to the control unit 300 via the sheet processing unit I/F 311 in advance (e.g., at activation of printer 103), and are stored in the storage 304 or the RAM 303.

Further, the control unit 300 is connected to the network 104 via a communication unit I/F 313. The communication unit I/F 313 transmits images and information to a communication apparatus on the network 104, and receives print data and information from the communication apparatus on the network 104.

Subsequently, an example of a software configuration of the terminal 106 will be described with reference to FIG. 4. An OS 405 includes a system 404 for basic operation of the OS. The system 404 includes a driver 406 that controls a device connected to the terminal 106, and a communication module 407 to enable the terminal 106 to communicate with outside via the network 104.

Figure 4:
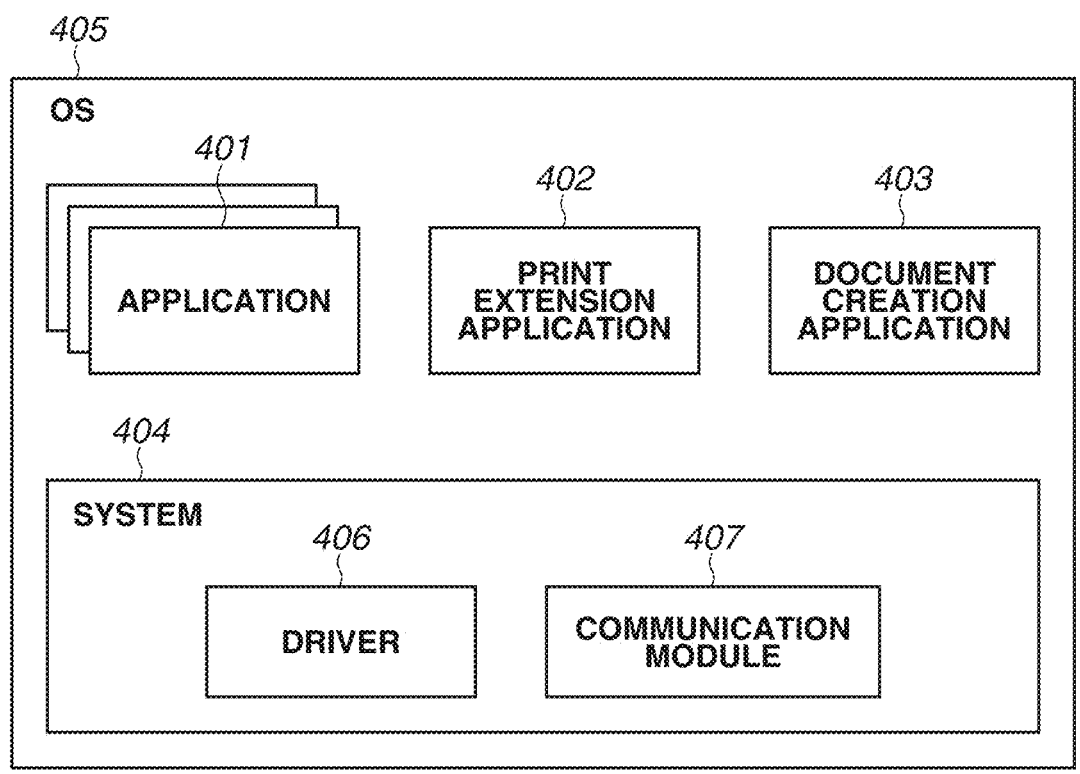
FIG. 4 is a diagram illustrating an example of a software configuration of the client computer according to the present exemplary embodiment.

Further, in FIG. 4, as external applications, applications 401, a print extension application 402, a document creation application 403 are installed.

The applications 401 are applications represented by a web browser. The plurality of applications 401 is installable in the OS 405. The applications 401 operate by any of foreground execution and background execution. In the foreground execution, the applications 401 are executed while UIs of the applications 401 are displayed on a display. In the background execution, the applications 401 are executed while the UIs are not displayed. The applications 401 are installed from an external cloud service (not illustrated) via the network 104. Alternatively, the applications 401 are previously installed in the OS 405 through a management system such as mobile device management (MDM) system.

The OS 405 is installed with the applications 401, the print extension application 402 performing operation dedicated for printing in cooperation with the cloud service, and the document creation application 403 that can create document data and image data such as spreadsheet data. The print extension application 402 may be a dedicated application, or a web application that includes a web browser displaying a web page.

The OS 405 is software that executes applications and manages overall resources. The OS 405 includes the system 404 that performs basic operation of the OS 405, and the system 404 includes the driver 406 that controls the display, the memories, etc., and the communication module 407. The communication module 407 is a module used when the applications 401 perform communication. The applications 401, the print extension application 402, and the document creation application 403 communicate with an external apparatus such as the cloud server 102 via the communication module 407.

Figure 5A:
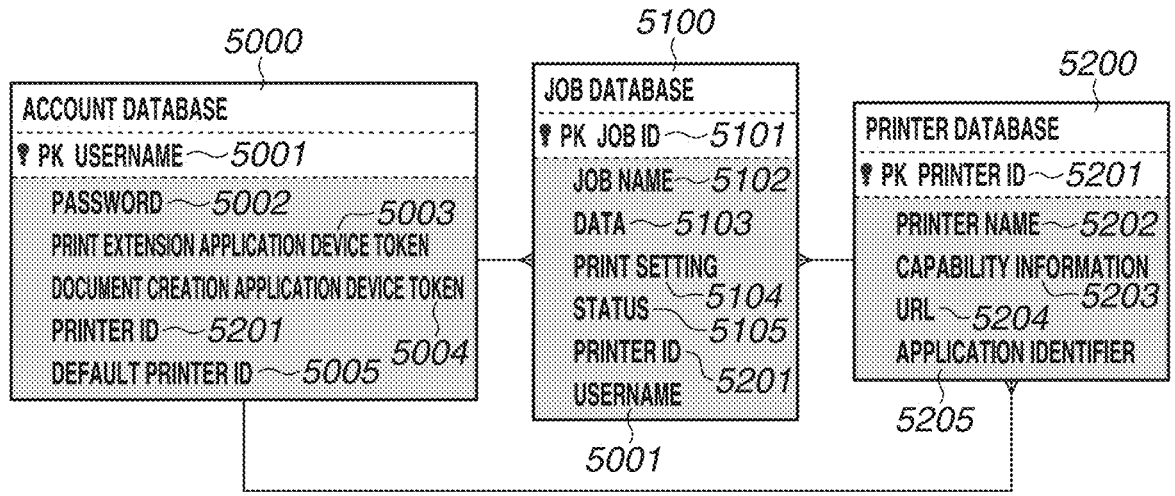
FIGS. 5A and 5B are diagrams illustrating an example of a software configuration of a cloud service according to the present exemplary embodiment.

Next, a software configuration of the cloud server 102 will be described with reference to FIGS. 5A and 5B. FIG. 5A is a relational diagram of databases in a cloud service 500 operating in the cloud server 102. As the databases, an account database 5000, a job database 5100, and a printer database 5200 are provided.

The account database 5000 is a database that has an identifier of a username 5001 as a main key for utilization, and manages users using the cloud service 500. Further, the account database 5000 stores the username 5001 and a password 5002 in association with each other. The account database 5000 further stores a print extension application device token 5003 corresponding to the username 5001. The print extension application device token 5003 is used to notify the print extension application 402 installed in the user terminal 106 and the client computer 101, of registration of a print job with the cloud service 500. Further, a document creation application device token 5004 that notifies the document creation application 403 of registration of the print job with the cloud service 500 is stored in association with the username 5001. Moreover, the account database 5000 stores a plurality of printer identifications (IDs) 5201 representing printers usable by the user, and a default printer ID 5005 representing a printer set by default. The default printer ID 5005 represents an optional printer among a plurality of printers corresponding to the printer IDs 5201.

These tokens function as identifiers different for each device. Values of device tokens 5003 and 5004 may be updated every time the print extension application 402 and the document creation application 403 in the terminal 106 are activated.

The printer database 5200 is a database that has the printer ID 5201 as a main key, and manages printers registered with the cloud service 500. The printer database 5200 stores a printer name 5202 and capability information 5203 of the printer in association with the printer ID 5201. The capability information 5203 of the printer is, for example, information indicating whether the printer supports color printing or only monochrome printing, and information about supported sheet sizes. The capability information 5203 further includes information indicating whether the printer can perform bookbinding printing, poster printing, and postprocessing after printing such as sheet folding and stapler punching. The printer database 5200 can notify the document creation application 403 and the print extension application 402 of functions executable by a printer selected by the user, by storing the printer ID 5201 and the capability information 5203 in association with each other. The printer database 5200 further stores a uniform resource locator (URL) 5204 to provide a web service, and an application identifier 5205 that is an identifier of an application extending a function of print setting, in association with the printer ID 5201.

Note that the information in the account database 5000 and the printer database 5200 necessary for printing are registered as a presetting before printing.

The job database 5100 is a database in which a print job is registered. The print job is registered with the job database 5100 every time the user performs printing. The job database 5100 includes a job ID 5101 as a main key. The job database 5100 further includes, as attributes, a job name 5102, data 5103 for printing, print setting 5104 set to a job, a status 5105 representing a status of the job, the printer ID 5201, and the username 5001. The username 5001 and the printer ID 5201 are external keys connecting the job database 5100 to the account database 5000 and the printer database 5200, respectively.

Figure 5B:
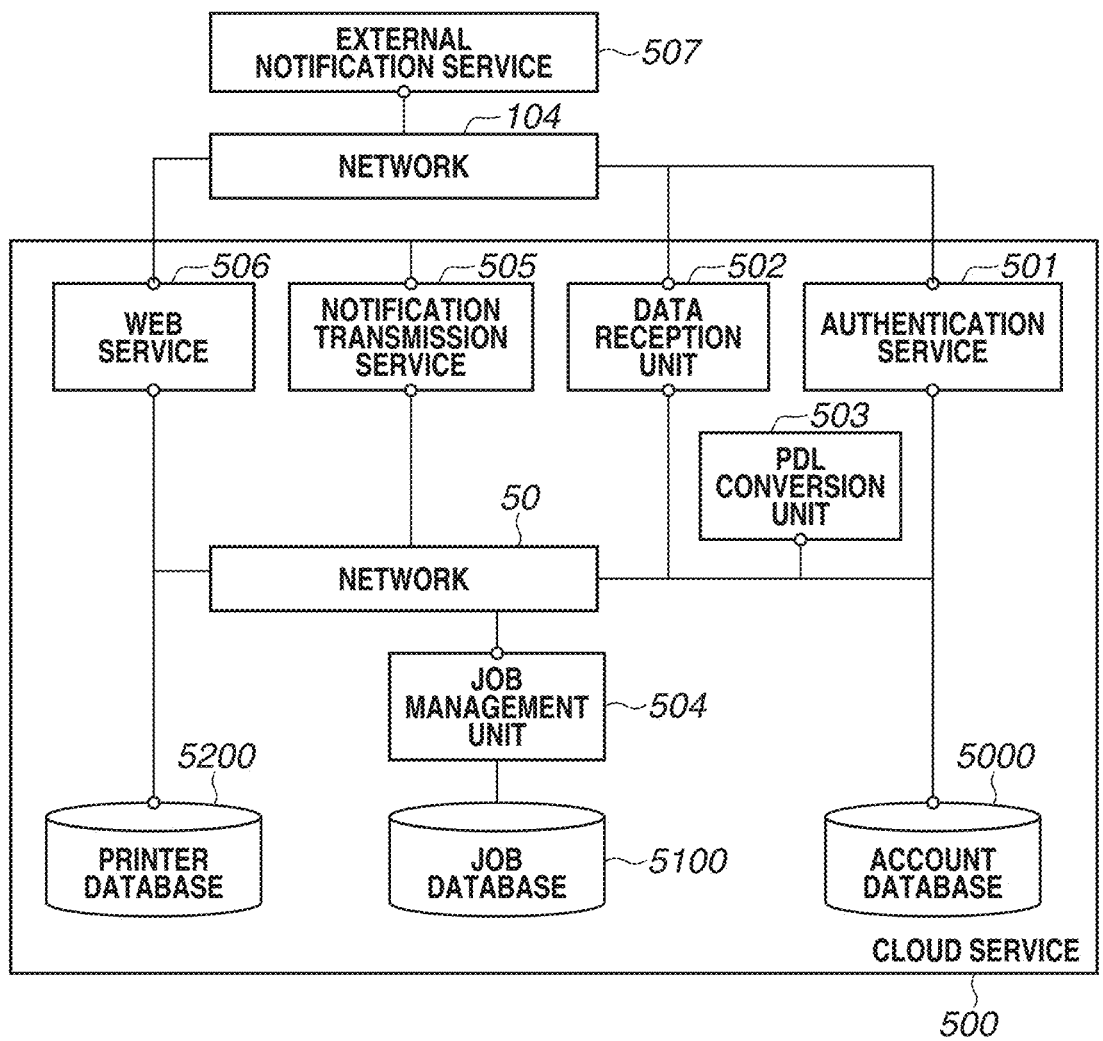

FIG. 5B is a block diagram illustrating a software configuration of the cloud service 500 operating in the cloud server 102. The configuration and an overall flow of the cloud service 500 will be described with reference to FIG. 5B. Individual services and the databases are connected via a network 50 inside the cloud, and can communicate with one another.

An authentication service 501 receives authentication information from the terminal 106 and the client computer 101, and collates the authentication information with the account database 5000 to perform authentication. In a case where the authentication succeeds, the authentication service 501 returns a response notifying success and an access token to a transmission source of an authentication request. In a case where the authentication fails, the authentication service 501 returns a response of authentication error to the transmission source of the authentication request.

A data reception unit 502 receives print data and print setting information in a Hypertext Transfer Protocol (HTTP) format via the network 104. The data reception unit 502 receives the print data and the print setting information in a format such as extensible markup language (XML) paper specification (XPS) and portable document format (PDF). Further, the data reception unit 502 can receive files such as a Word® file, a PowerPoint® file, and an Excel® file as the print data and the print setting.

A PDL conversion unit 503 converts data received from the data reception unit 502 into PDL data such as PDF data and PWGRaster data, and passes the PDL data and the print setting information to a job management unit 504.

The job management unit 504 queues the PDL data and the print setting information, imparts a job ID to each piece of print data, and registers the print data as a print job with the job database 5100 together with the other information such as the username 5001.

Based on registration of the print job with the job database 5100, a notification transmission service 505 requests an external notification service 507 to notify the print extension application 402 or the document creation application 403 of the registration. To notify the print extension application 402 of the registration, the notification transmission service 505 requests the external notification service 507 to perform notification using the print extension application device token 5003. To notify the document creation application 403 of the registration, the notification transmission service 505 requests the external notification service 507 to perform notification using the document creation application device token 5004. The notification transmission service 505 can request the external notification service 507 to notify the application as a notification destination of data in a format such as JavaScript® Object Notation (JSON). At this time, the notification includes information such as the job ID 5101 in the job database 5100, an optional message indicating registration of the job, the URL 5204 of the web service 506, and the application identifier 5205 of the print extension application 402.

The web service 506 is a service that performs print setting to the registered job. When the terminal 106 accesses the URL 5204 after the job is registered, the web service 506 acquires the data 5103 from the job management unit 504. Further, the web service 506 acquires the capability information 5203 of the printer from the printer database 5200. Thereafter, the web service 506 returns information on a detailed print setting screen to the caller. Further, the web service 506 receives a print instruction from the print extension application 402, and transmits edited print data to the printer 103.

The web service 506 is a web service that enables the service relating to printing to be used from outside. The web service 506 receives the print job, and receives change of the print setting. Further, the web service 506 can return the list of printers registered with the printer database 5200, and a web application programming interface (API) of the capability information on each of the printers. The web service 506 may return information on hypertext transfer protocol (HTML) of the web page for the print setting, etc. to the caller.

The external notification service 507 is a service represented by Apple Push Notification service (APNs). The external notification service 507 transmits notification to the terminal 106 based on a request. The external notification service 507 can communicate with the cloud service 500, the terminal 106 illustrated in FIG. 2, etc. via the network 104.

FIG. 6 is a diagram illustrating an example of a software configuration of the printer 103 according to the present exemplary embodiment.

A data acquisition unit 604 acquires the job in the job database 5100 of the cloud service 500, and passes the data 5103 and the print setting 5104 of the acquired job to a print job generation unit 605.

The print job generation unit 605 requests a job control unit 608 to register a new job inside the printer 103 and to start print processing, based on the data 5103 and the print setting 5104 of the job acquired by the data acquisition unit 604. In addition, the print job generation unit 605 transfers the received data 5103 and the received print setting 5104 to a data reception control unit 606.

After the print job generation unit 605 generates the print job to be managed inside a multifunctional peripheral, the attributes of the print job are stored in a job attribute storage unit 609.

The data reception control unit 606 serves as a buffer area for the data 5103 and the print setting 5104 received by the print job generation unit 605, and temporarily stores the reception data for each print job in the storage 304. The job control unit 608 instructs a PDL analysis unit 607 to perform PDL analysis processing of a specific print job based on completion of execution preparation of the specific print job. The PDL analysis unit 607 requests the data 5103 and the print setting 5104 corresponding to the specific print job, to the data reception control unit 606. The data reception control unit 606 transfers the data 5103 and the print setting 5104 corresponding to the specific print job, to the PDL analysis unit 607.

The PDL analysis unit 607 generates intermediate data based on the attribute information (e.g., number of copies, Nup, color mode, and setting of postprocessing) on the specific print job stored in the job attribute storage unit 609, and the print data corresponding to the specific print job. The generated intermediate data is transferred to a RIP control unit 610. The RIP control unit 610 cooperates with the RIP of the image processing unit 314 to convert the intermediate data into a raster image. A print control unit 611 acquires the raster image generated by the RIP control unit 610, and transfers CMYK print images obtained by color separation to an engine control unit 612. The engine control unit 612 forms an image on a sheet based on the CMYK print images and performs postprocessing such as stapler punching on the sheet on which the image has been formed, in cooperation with the printing unit 310 and the sheet processing unit 312.

Figure 7A:
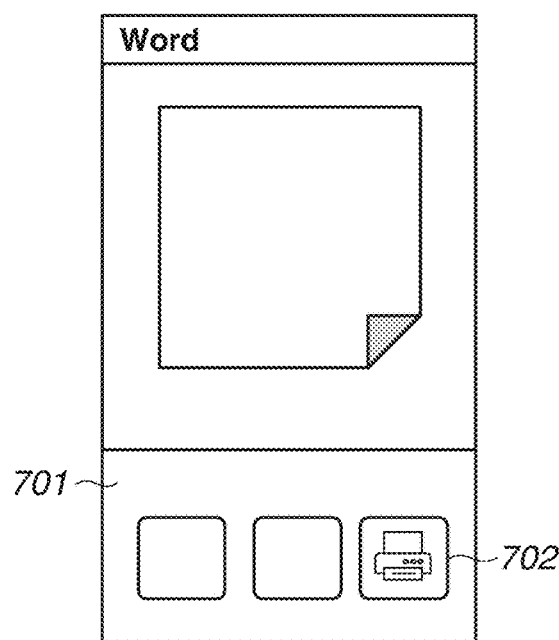
FIGS. 7A, 7B, 7C, and 7D are diagrams each illustrating an example of a user interface (UI) displayed on a terminal by a document creation application according to the present exemplary embodiment.
Figure 7B:
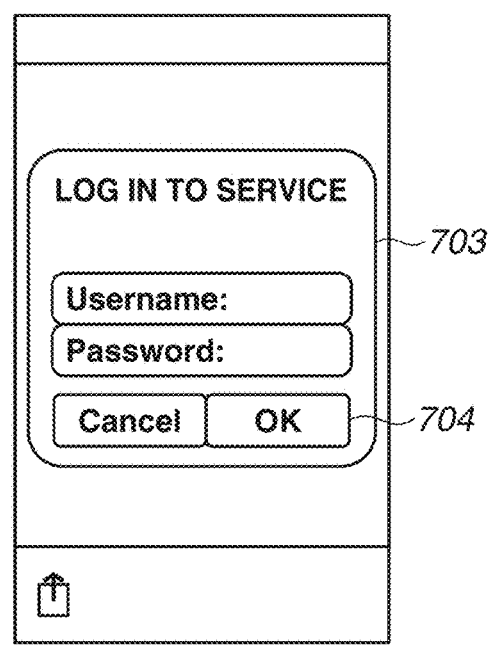

A flow of operations on the terminal 106 up to the point where printing is performed will be described with reference to FIGS. 7A, 7B, 7C, and 7D. Here, it is assumed that registration of the printer 103 with the cloud server 102 is already completed. FIG. 7A illustrates a state where the document creation application 403 is activated. In FIG. 7A, the document creation application 403 is described, however, the other application 401 may be used. In a menu bar 701, buttons as selection options of menus, for example, a button to share a document with the other terminal and a button to perform print setting are displayed side by side. A print button 702 in the selection options is a button to display a screen for print setting of opened document data and execution instruction of printing. When the print button 702 is pressed, an authentication popup screen 703 illustrated in FIG. 7B is displayed. The authentication popup screen 703 is a screen for logging into the cloud service 500. When the user enters the username and the password, and then presses an OK button 704, the terminal 106 transmits an authentication request to the cloud service 500. After the cloud server 102 completes authentication, the user can log into the cloud service 500. After login, the screen displayed on the terminal 106 makes transition to a print screen illustrated in FIG. 7C.

Figure 7C:
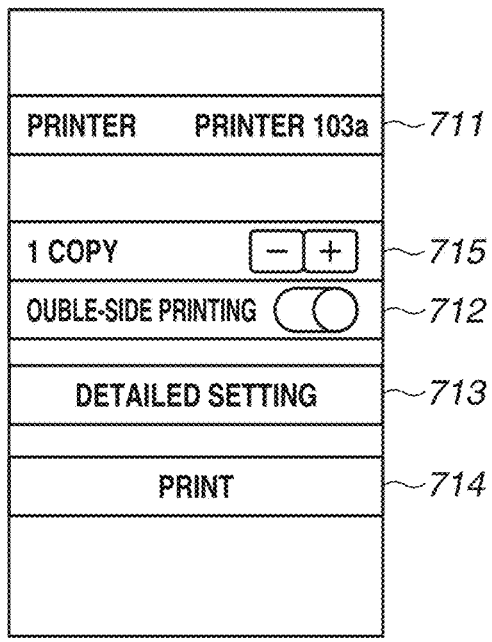
Figure 7D:
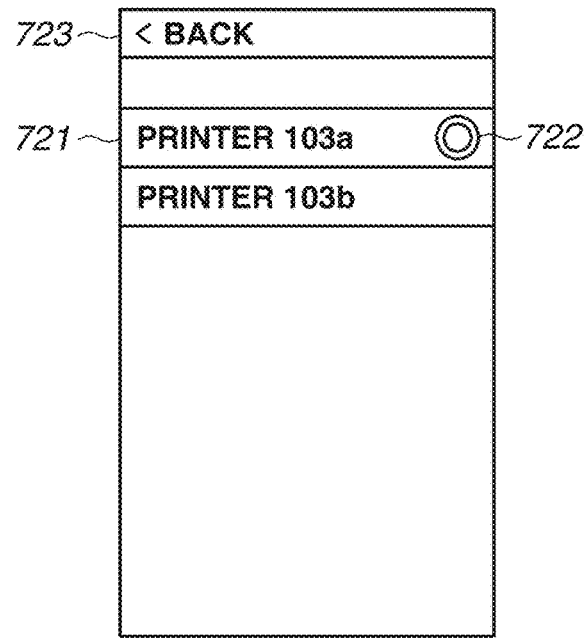

FIG. 7C illustrates a print setting screen provided by the document creation application 403 and is a screen for setting items used in printing. A printer selection button 711 is a button to select a printer to be used for printing. When the printer selection button 711 is pressed, a printer selection screen in FIG. 7D is displayed on the display unit of the terminal 106. In FIG. 7D, the printer 103a set by default is selected. A button 712 is a button to perform setting of double-side printing. When the user presses the button 712, the setting is changed from single-side printing to double-side printing. When the user presses the button 712 again, the setting is changed from the double-side printing to the single-side printing. In this example, control of the double-side printing that is one of the functions held by the printer 103 is displayed, however, simple functions used in common by a plurality of printer vendors conforming to internet printing protocol (IPP), for example, color-monochrome conversion that is a function held by the other printer may be displayed. An area 715 is an area where the number of copies is set. In the area 715, the number of copies currently set is displayed. When the user presses a "plus (+)" button, the number of copies is incremented by one. When the user presses a "minus (−)" button, the number of copies is decremented by one.

Figure 10A:
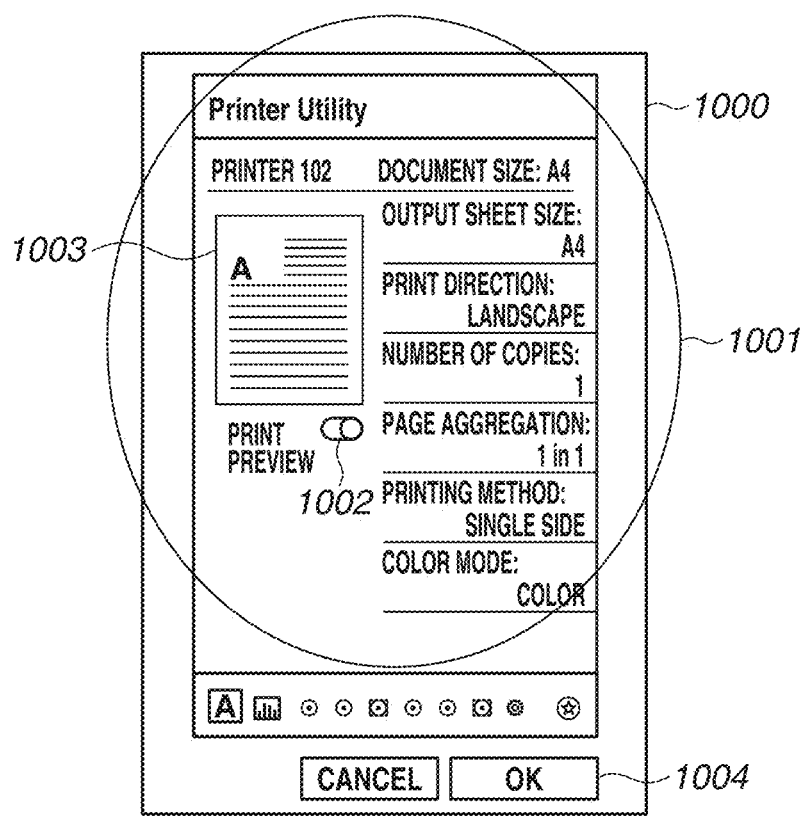
FIGS. 10A, 10B, and 10C are diagrams each illustrating an example of a UI displayed on the terminal by a print extension application according to the present exemplary embodiment.

A button 713 is a detailed setting button. When the user presses the detailed setting button 713, the print extension application 402 is activated, and a detailed print setting screen illustrated in FIG. 10A is displayed. The detailed print setting screen will be described below. In a case where the print extension application 402 is not installed, the document creation application 403 displays a detailed print setting screen. In the detail print setting screen displayed by the document creation application 403, a vendor-specific function such as poster printing is not displayed.

A button 714 is a print start button. When the user presses the print start button 714, the document creation application 403 transmits the print data and the print setting information to the cloud server 102 via the web service 506 of the cloud service 500, and requests printing.

FIG. 7D illustrates the printer selection screen. When the user selects the printer selection button 711, the terminal 106 requests information on printers registered with the printer database 5200 via the web service 506. The terminal 106 displays a list of the printers acquired via the web service 506. An icon 722 indicates a printer currently selected. A link 723 is a back link. When the user presses the back link 723, the print screen in FIG. 7C is displayed on the display unit of the terminal 106.

A flow for registering the applications and the printer 103a with the cloud service 500 will be described with reference to FIG. 8. It is assumed that the username 5001 and the password 5002 of a necessary account have already been registered with the account database 5000.

In step S801, the document creation application 403 requests the external notification service 507, which is used by the cloud service 500 to notify the document creation application 403, to issue the document creation application device token 5004.

In step S802, the external notification service 507 generates a universally unique identifier (UUID), and returns the generated UUID as the document creation application device token 5004 to the document creation application 403. The document creation application device token 5004 is an identifier for identification of the terminal 106 and the document creation application 403, and any other identifier may be used as long as the identifier enables identification of the application.

In step S803, the document creation application 403 transmits, to the cloud service 500, authentication information for the user using the document creation application 403 to use the cloud service 500. In step S804, the cloud service 500 returns an access token for the document creation application 403 to access the cloud service 500.

In step S805, the document creation application 403 accesses the cloud service 500 by using the acquired access token, and registers the document creation application device token 5004 with the account database 5000. The document creation application device token 5004 registered with the cloud service 500 at this time is the token issued in step S802.

In step S806, the cloud service 500 notifies the document creation application 403 of registration completion of the document creation application device token 5004. Steps S801 to S806 are performed at the time of installation or initial activation of the document creation application 403.

Next, in step S807, the print extension application 402 requests the external notification service 507 to issue the print extension application device token 5003. In step S808, the external notification service 507 generates a UUID, and returns the UUID as the print extension application device token 5003 to the print extension application 402.

In step S809, the print extension application 402 receives the authentication information for the print extension application 402 to access the cloud service 500, and transmits the authentication information to the cloud service 500. In step S810, the cloud service 500 returns an access token. In step S811, the print extension application 402 accesses the cloud service 500 by using the acquired access token, and registers the print extension application device token 5003 with the account database 5000. In step S812, the cloud service 500 notifies the print extension application 402 of registration completion of the device token 5003. The print extension application device token 5003 is an identifier for identification of the terminal 106 and the print extension application 402, and any other identifier may be used as long as the identifier enables identification. Steps S807 to S812 are performed at the time of installation or initial activation of the print extension application 402.

Subsequently, in step S813, the printer 103a receives authentication and transmits the authentication information to the cloud service 500. In step S814, the cloud service 500 performs authentication and returns an access token. In step S815, the printer 103a accesses the cloud service 500 by using the access token, and registers the printer information with the printer database 5200. At the same time, the cloud service 500 registers the printer ID 5201 of the account database 5000 to the authenticated account. In a case where the default printer ID 5005 is not registered, the cloud service 500 registers the default printer ID 5005. In step S816, the cloud service 500 notifies the printer 103a of registration completion of the printer information. Steps S813 to S816 are performed when the printer 103a is registered with the cloud service 500. As described above, in the present exemplary embodiment, the access token is issued when the printer 103a requests registration with the cloud service 500. Thereafter, the cloud service 500 acquires the information on the printer 103a.

Figure 9A:
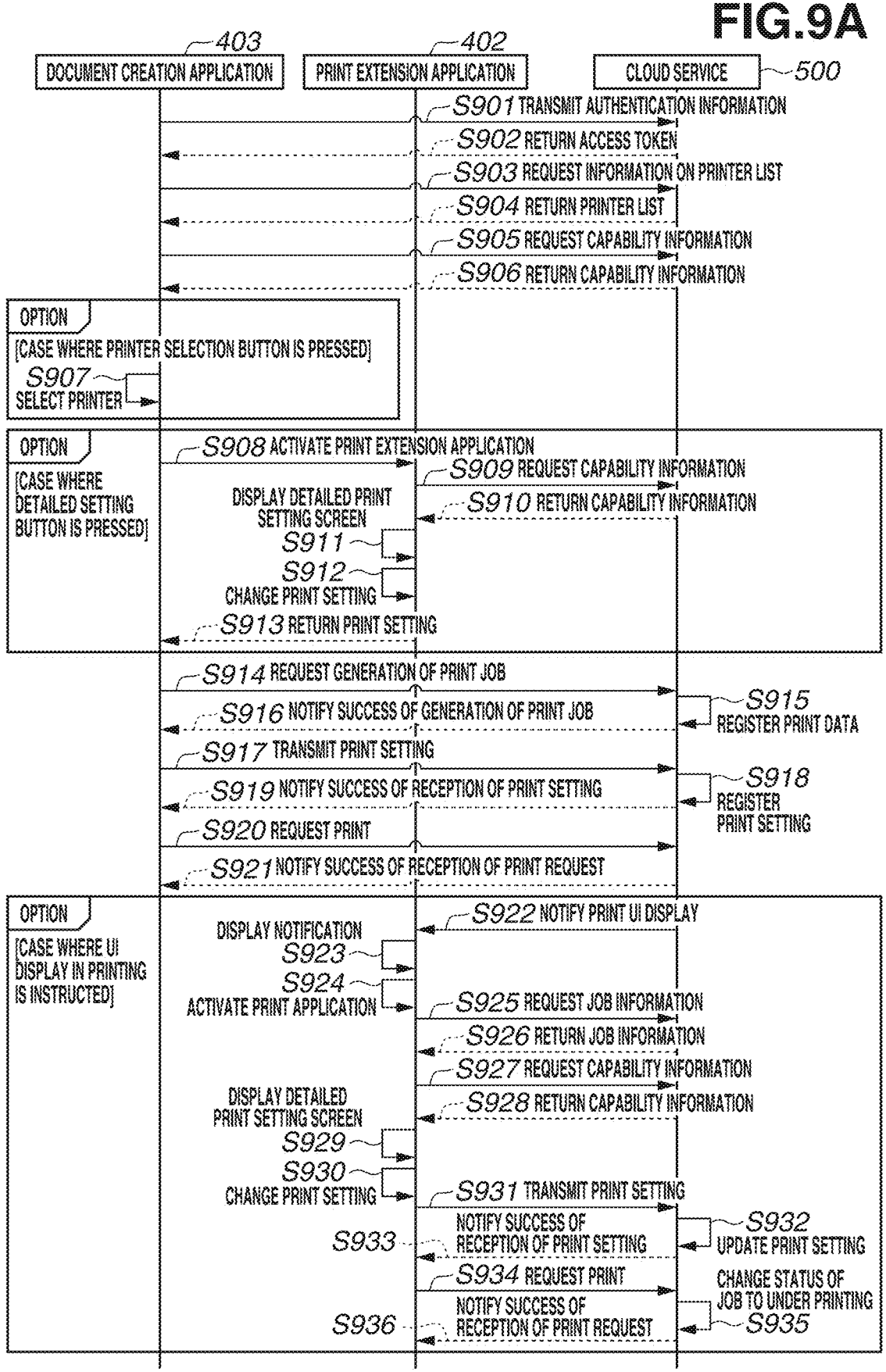
FIGS. 9A and 9B are sequence diagrams of a printing flow according to a first exemplary embodiment.

A flow of printing will be described with reference to FIGS. 9A and 9B. FIG. 9A illustrates a flow up to the point where the document creation application 403 instructs the cloud service 500 to perform printing.

First, in step S901, the document creation application 403 of the terminal 106 described in FIG. 7B transmits the authentication information to the cloud service 500. The cloud service 500 inquires of the authentication service 501 about the authentication information. In step S902 after authentication, the cloud service 500 returns, to the document creation application 403, a token for access to the other service including the web service 506 of the cloud service 500. After the document creation application 403 acquires the token, in step S903, the document creation application 403 transmits a request to acquire information on the list of the printers, to the web service 506 of the cloud service 500.

In step S904, in response to the request, the cloud service 500 returns the information on the list of the printers usable by the user, to the document creation application 403, based on the printer ID 5201 of the account database 5000.

Next, in step S905, the document creation application 403 requests the capability information of the printer selected by default to the cloud service 500 based on the default printer ID 5005. In step S906, the cloud service 500 accesses the printer database 5200, and returns the capability information 5203 of the corresponding printer to the document creation application 403. As a result, the document creation application 403 can know the functions usable by the printer selected in the print setting screen and the print extension application 402 corresponding to the selected printer.

The printer name selected by default is displayed on the printer selection button 711 of the print screen. In a case where the printer selection button is pressed after display, the printer selection screen is displayed and selection of a printer is received in step S907. In a case where the user selects the printer selection button 711 and changes the printer to be used, the document creation application 403 acquires the capability information of the changed printer from the cloud service 500.

When the detailed setting button 713 of the printer is pressed in the print screen, the document creation application 403 activates the print extension application 402 associated with the printer, based on the application identifier 5205 registered with the printer database 5200 in step S908. In step S908, the document creation application 403 accesses the printer database 5200 of the cloud service 500, and acquires the application identifier corresponding to the selected printer. Thereafter, the document creation application 403 activates the application corresponding to the application identifier. At the time of activation, the document creation application 403 passes information about print setting already set, to the print extension application 402. In other words, the document creation application 403 passes set values set in the screen of FIG. 7C to the print extension application 402. Alternatively, the document creation application 403 may pass the job ID of the print job to the print extension application 402. Further, in step S908, there is a case where the application corresponding to the application identifier acquired by the document creation application 403 from the cloud service 500 is not installed in the terminal 106. At this time, the document creation application 403 may display a URL of the web page where the application extension application is distributed, or may display a screen to activate the other application for downloading the print extension application. This makes it possible to encourage the user to download the print extension application.

In the present exemplary embodiment, in step S908, the document creation application 403 acquires the application identifier from the cloud service 500. Alternatively, in step S905, the document creation application 403 may transmit a request to acquire the application identifier together with the capability information to the cloud service 500, and may receive the application identifier together with the capability information from the cloud service 500.

In step S909, the activated print extension application 402 requests functions such as double-side printing and bookbinding and the capability information of the printer such as a device configuration, to the cloud service 500 via the web service 506. The necessary information may be information in a format such as JSON, HTML, cascading style sheets (CSS), and JavaScript®. In a case where the print extension application 402 is a web application including a web browser, the print extension application 402 transmits a request to acquire information indicating a screen configuration of the detailed print setting screen to be displayed in addition to the capability information of the printer, to the cloud service 500.

In step S910, the cloud service 500 returns the information on the requested detailed print setting screen to the print extension application 402. In step S910, the capability information acquired by the print extension application 402 from the cloud service 500 may be capability information similar to or different from the capability information acquired by the document creation application 403 from the cloud service 500 in step S906.

In step S911 after acquisition of the capability information, the print extension application 402 displays the detailed print setting screen illustrated in FIG. 10A. The print extension application 402 displays the detailed print setting screen by using the capability information on the printer 103 acquired from the cloud service 500 and the screen information held by the print extension application 402. In the case where the print extension application 402 is a web application, the detailed print setting screen is configured based on the information received from the cloud service 500.

In step S912 after the print extension application 402 displays the detailed print setting screen, the print extension application 402 receives change of print setting. In step S913 after the print setting is changed, the print extension application 402 returns the information on the set print setting to the document creation application 403. The information on the print setting returned at this time includes, for example, setting regarding color printing, poster printing, and bookbinding printing. The document creation application 403 displays the print screen again based on the information on the print setting returned from the print extension application 402. At this time, the document creation application 403 performs display while ignoring information on vendor-specific print setting that cannot be identified by the document creation application 403.

In step S914, when the print start button 714 is pressed in the print screen, the document creation application 403 passes the print data to the cloud service 500 and requests the cloud service 500 to generate a job via the web service 506. The cloud service 500 passes the print data to the data reception unit 502.

The data reception unit 502 passes the print data to the PDL conversion unit 503. After the print data is converted into the PDL print data, the data reception unit 502 passes the PDL print data to the job management unit 504. In step S915, the job management unit 504 imparts the job ID 5101 to the print data, and registers the print data with the job database 5100. In step S916 after the print data is registered with the job database 5100, the cloud service 500 notifies the document creation application 403 of success of generation of the print job. In step S917, the document creation application 403 transmits the print setting information to the cloud service 500. The cloud service 500 passes the print setting information to the job management unit 504. In step S918, the job management unit 504 registers the received print setting information to the corresponding job ID of the job database 5100. In step S919 after the print setting information is registered, the cloud service 500 notifies the document creation application 403 of success of registration of the print setting information. In step S920, upon receiving notification of success of registration of the print setting information, the document creation application 403 transmits a print request to the cloud service 500. In step S921, upon receiving the request, the cloud service 500 notifies the document creation application 403 of success of reception of the print request.

The cloud service 500 analyzes the print setting information. At this time, in a case where preview in printing is set, the cloud service 500 requests the external notification service 507 to perform notification via the notification transmission service 505 of the cloud service 500. When requesting the notification, the cloud service 500 notifies the document creation application 403 based on the print extension application device token 5003 of the account database 5000 in step S922. Notification includes the job ID 5101 and a text message indicating that the print data have been registered with the job database 5100. In step S922, the cloud service 500 transmits notification to the print extension application device token 5003 registered with the account database 5000. In a case where the user of a certain username has a plurality of terminals 106, a plurality of print extension application device tokens may be associated with one username. In this case, the cloud service 500 may perform notification to each of the print extension application device tokens. Further, the cloud service 500 may perform notification to the print extension application device token of the print extension application installed in the same terminal as the terminal of the document creation application that has transmitted the image data.

As the condition to perform the notification, ON/OFF of the preview function has been described as an example, however, the notification may be performed based on any other condition. For example, the cloud service 500 may be previously set so as to inevitably perform the notification, or the notification may be inevitably performed in a case where specific print setting is set.

In step S923, the print extension application 402 receives the notification from the cloud service 500, and displays the notification on the terminal 106. In the present exemplary embodiment, the print extension application 402 receives the notification from the cloud service 500, and displays the notification. Alternatively, in step S922, the OS of the terminal 106 may receive the notification from the cloud service 500, and may display the notification on the display. Still alternatively, the cloud service 500 may transmit the notification to the document creation application 403 based on the document creation application device token 5004. In this case, the document creation application 403 may display the notification, and may activate the print extension application 402 in response to user operation.

In step S924, the terminal 106 receives an event such as click and tap, and the document creation application 403 activates the print extension application 402. At the time of performing the notification, the cloud service 500 may notify the print extension application 402 based on the print extension application device token 5003.

In step S925, the print extension application 402 accesses the web service 506 of the cloud service 500, and requests the job information by using the job ID included in the notification. In step S926, the cloud service 500 reads out the job ID and the job information registered with the job database 5100, and returns the job ID and the job information to the print extension application 402. Next, in step S927, the print extension application 402 requests the printer capability information to the cloud service 500 via the web service 506. The cloud service 500 acquires the printer ID associated with the job in the job database 5100, and acquires the printer capability information from the printer database 5200. In step S928 after acquisition of the printer capability information, the cloud service 500 returns the printer capability information to the print extension application 402. In step S929, the print extension application 402 generates the detailed print setting screen including print preview, from the acquired job and the acquired printer capability information, and displays the detailed print setting screen. In step S930 after display of the detailed print setting screen, the print extension application 402 receives change of the print setting. In step S931 after reception of change of the print setting, the print extension application 402 transmits the changed print setting 5104 and the job ID of the job to the cloud service 500. In step S932, the cloud service 500 updates the job database 5100 by overwriting the print setting 5104 of the job specified by the job ID with the print setting received from the print extension application 402. In step S933 after registration, the cloud service 500 notifies the print extension application 402 of reception of change of the print setting. In step S934, the print extension application 402 instructs printing of the print job. In step S935, the cloud service 500 changes the status 5105 of the job in the job database 5100 to "under printing". In step S936 after change of the status, the cloud service 500 notifies success of reception of the print request.

In FIG. 9A, the processing in and after step S922 is performed after the print request is registered with the cloud service 500 in step S921. Alternatively, the processing in and after step S922 may not be performed. Still alternatively, the processing in steps S908 to S913 may not be performed, and the processing in and after step S914 may be performed after step S907.

Figure 9B:
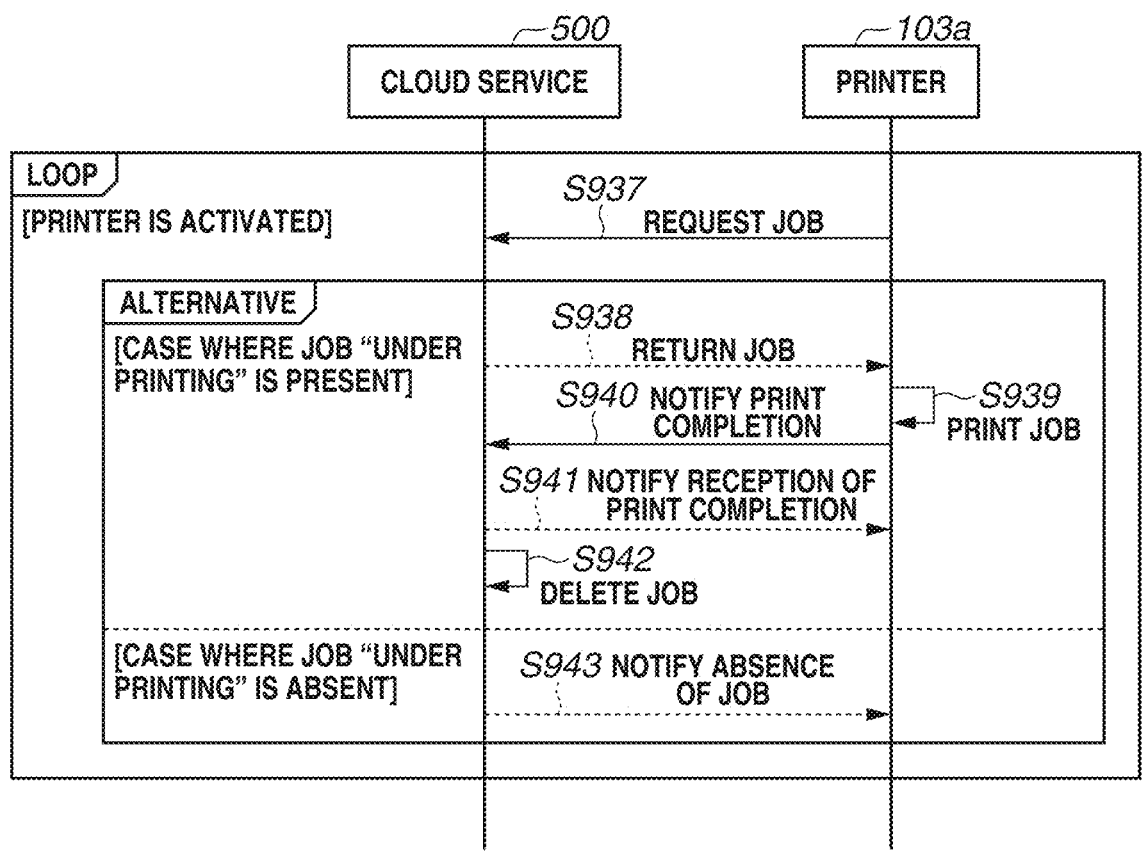

FIG. 9B is a sequence diagram illustrating a flow up to the point where the printer 103a performs printing. In step S937, the printer 103a performs polling every predetermined time to inquire of the cloud service 500, and requests the job the status 5105 of which is "under printing". In a case where the job "under printing" is present, the cloud service 500 returns the job in step S938. In step S939 after the printer 103*a* acquires the job, the printer 103*a* performs printing. In step S940 after printing, the printer 103*a* notifies the cloud service 500 of completion of the printing. In step S941, the cloud service 500 notifies the printer 103*a* of reception of print completion.

Next, in step S942, the cloud service 500 deletes the print data, notification of print completion of which has been received, from the job database 5100. In a case where the job the status 5105 of which is "under printing" is absent, notification indicating that a job "under printing" is absent is transmitted in step S943.

In FIGS. 9A and 9B, the print extension application 402 is described as an application operating in local of the terminal 106, however, the print extension application 402 may be a web application. In a case where the print extension application 402 is a web application, the print extension application 402 acquires not only the capability information on the printer 103 but also the information on the screen displayed on the terminal 1036 in HTML format from the cloud service 500 in steps S910 and S928.

The detailed print setting screen will be described with reference to FIGS. 10A, 10B, and 10C. A page 1000 in FIG. 10A is a top page of the detailed print setting screen of the print extension application 402 activated in step S908 and step S924. The detailed print setting screen may include a plurality of pages. In this case, the page may make transition to the other page in response to user operation such as sliding of a finger. The detailed print setting screen includes a print setting section 1001, and enables more detailed print setting than the setting in FIG. 7C by receiving user operation. The printer vendor-specific print setting can be set when such setting is registered with the printer database 5200. In the top page of the detailed print setting screen, for example, page aggregation setting for setting the number of pages to be printed in one sheet and a print direction that are not settable in the screen in FIG. 7C are settable. A control 1002 is a control for a preview function. When the control 1002 is turned on, setting will be made to provide a preview at the time of printing. Note that, in the case where the print extension application 402 is activated in step S922, the control 1002 is disabled by being grayed out or hidden. A preview area 1003 displays a print preview of a document to be printed. Note that, in the case where the print extension application 402 is activated in step S908, an alternative virtual print preview is displayed because the document to be printed cannot be acquired. When an OK button 1004 is pressed after the print setting is changed, printing is determined. The processing then proceeds to step S913.

Figure 10B:
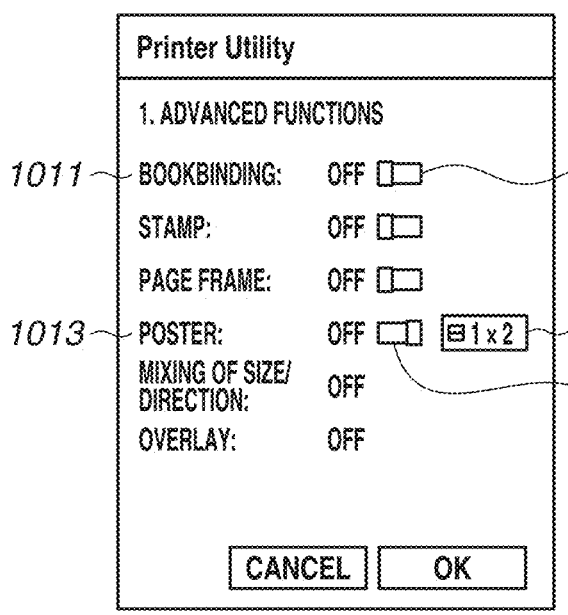

FIG. 10B illustrates an advanced function screen of the detailed print setting screen provided by the print extension application 402. FIG. 10B illustrates the screen displayed in response to operation such as sliding of a finger in FIG. 10A. In the advanced function screen, printer vendor-specific functions are listed, and items not settable in the print setting screen illustrated in FIG. 7C are settable. In a bookbinding function 1011, a toggle 1012 is slid to turn on the bookbinding function in the print setting. In a poster function 1013, a toggle 1014 is slid to turn on the poster function in the print setting. Further, a combo box 1015 is changed to set information such as detailed layout. In this example, printing of a poster consisting of two sheets is set. The vendor-specific functions are not limited to the poster printing, and examples of the vendor-specific functions include stapler setting for binding sheets, folding setting for folding and outputting sheets, punch setting for punching sheets, setting of a discharge destination, and setting of a sheet discharge method when printing is performed on a plurality of sheets. As described above, using the print extension application 402 makes it possible to set items that are not settable in the generic print setting screen.

Figure 10C:
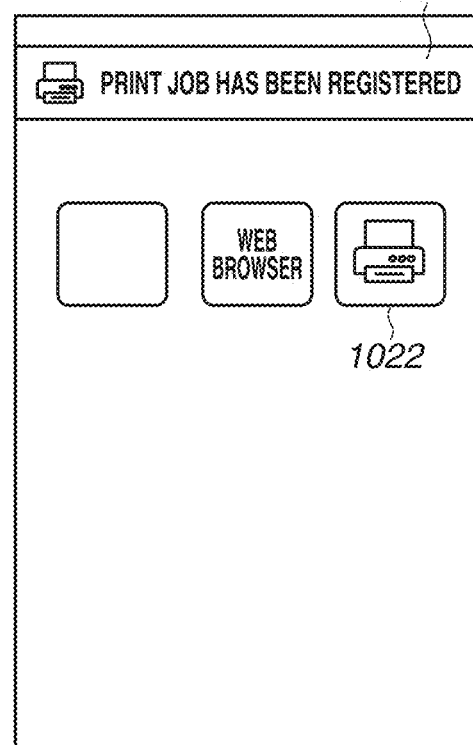

FIG. 10C illustrates a menu screen of the terminal 106*a*. In the menu screen, icons representing the installed applications 401 are arranged. In this example, a button 1021 displays the notification received from the external notification service 507. When the button 1021 is pressed, the print extension application 402 is activated.

An icon 1022 represents the print extension application 402. When the icon 1022 is pressed, the print extension application 402 is activated as described in step S924. After the print extension application 402 is activated, the print extension application 402 accesses the URL 5204 described in the notification, and acquires information on the detailed print setting screen necessary for generation of the print setting from the web service 506 of the cloud service 500. The information to be acquired is not limited to the print setting and the information on the print job, and may include layout in the format such as HTML, CSS, and JavaScript®. Therefore, in place of activation of the print extension application 402, a web browser may be activated in order to display the detailed print setting screen, and the web browser may be used as an alternative.

As described above, in the present exemplary embodiment, even in a case where the document creation application 403 does not provide a screen for vendor-specific print setting, using the print extension application 402 makes it possible to perform printing with more detailed setting.

In addition, even in a case where the document creation application 403 does not pass the information about the printer 103 acquired from the cloud service 500, to the print extension application 402, the print extension application 402 can display the print setting screen corresponding to the capability information of the selected printer.

In the first exemplary embodiment, when the user selects the detailed setting button 713 in FIG. 7C, the document creation application 403 activates the print extension application 402. In the case where the document creation application 403 does not have a function to activate the print extension application 402, the document creation application 403 cannot activate the print extension application 402 at the above-described timing.

In a second exemplary embodiment, the cloud service 500 activates the print extension application 402 in response to selection of the detailed setting button 713.

Description of FIG. 1 to FIG. 8, FIG. 9B, and FIGS. 10A and 10B will be omitted because the drawings are similar to the first exemplary embodiment.

Processing when image data created by the document creation application 403 is printed in the second exemplary embodiment will be described with reference to FIG. 11.

Figure 11:
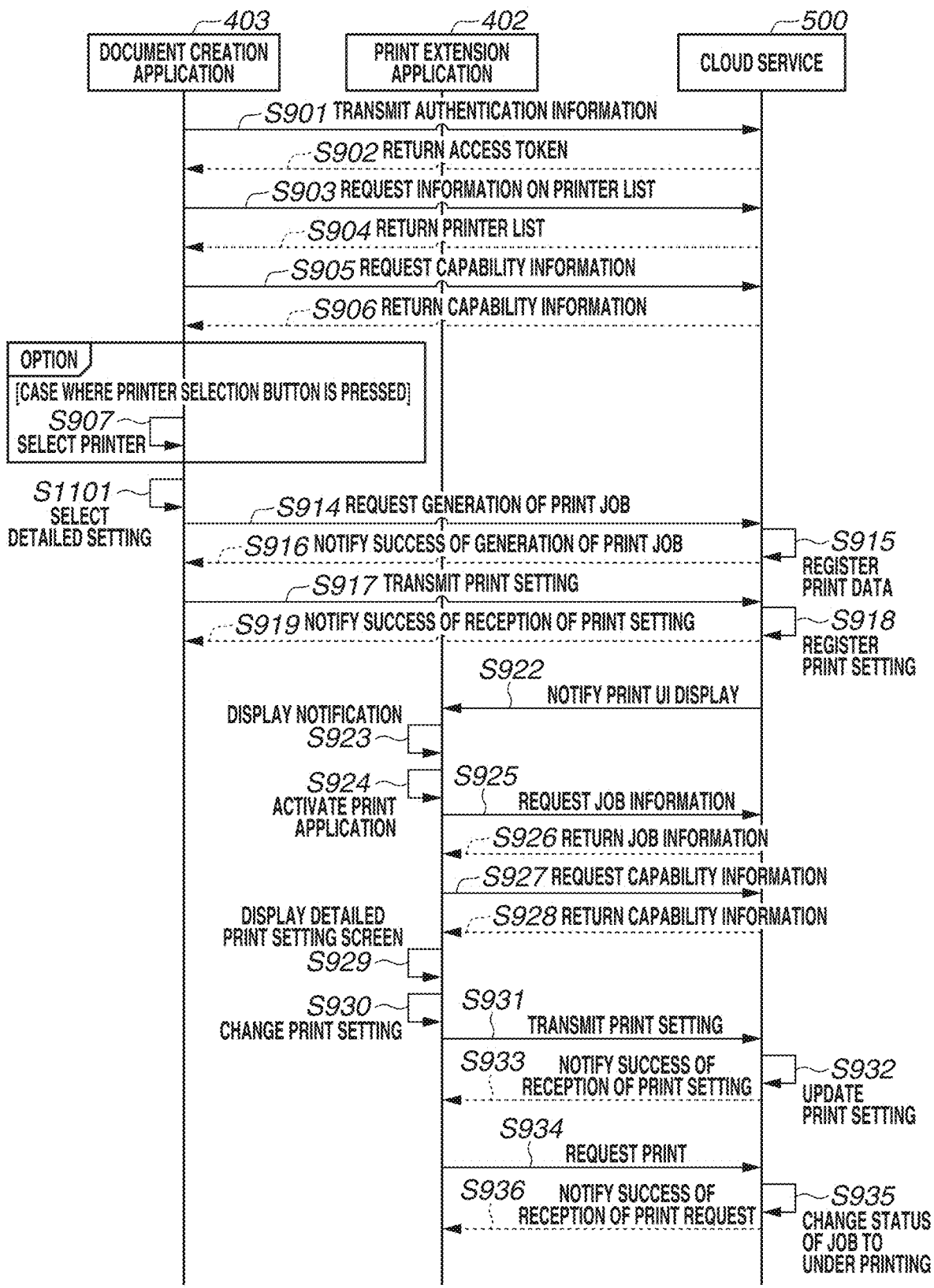
FIG. 11 is a sequence diagram of a printing flow according to a second exemplary embodiment.

Processing that is described in FIG. 11 and is same as the processing in FIG. 9A is denoted by the same reference numeral in FIG. 9A, and description of the processing will be omitted.

The processing described in FIG. 11 is started in response to print setting being performed in the document creation application 403. The processing described in FIG. 11 is implemented when the CPU of the terminal 106 or the CPU of the cloud server 102 executes a program.

The processing in steps S901 to S907 is similar to the processing in the first exemplary embodiment. In step S1101, the user selects the detailed setting button 713 in the print setting screen illustrated in FIG. 7C. In step S914, the document creation application 403 requests the cloud service 500 to create a print job in response to selection of the detailed setting button 713. The processing in steps S914 to S919 and S922 to S936 is similar to the processing in FIG. 9B. In the second exemplary embodiment, the cloud service 500 transmits notification to activate the print extension application 402 in response to the user instructing the detailed setting in the print setting screen of the document creation application 403. In the present exemplary embodiment, the user does not instruct printing. Therefore, the processing in steps S920 and S921 is not performed. The processing in steps S920 and S921 may be performed even in the case where the user selects the detailed setting.

In the first exemplary embodiment, in step S923, the message indicating that the print job has been registered with the cloud server 102 is displayed. In the second exemplary embodiment, in step S923, a message inquiring of the user whether to activate the print extension application 402 is displayed. Further, in step S923, a message prompting the user to perform operation for activation of the print extension application 402 may be displayed. The print extension application 402 is activated in response to the user performing the operation for activation of the print extension application 402 in the screen.

As a result, even in the case where the document creation application 403 cannot activate the print extension application 402, the print extension application 402 can be activated when the user attempts to perform the detailed setting of printing. Further, even when the document creation application 403 cannot transmit the print setting set in the document creation application 403 to the print extension application 402, the print extension application 402 can take over the set values set by the user in the document creation application 403 and can perform setting.

Other Exemplary Embodiments

In the above-described exemplary embodiments, the print extension application 402 is previously installed in the terminal 106. In the case where the print extension application 402 is not installed, the print setting is performed in the print setting screen provided by the document creation application 403. The terminal 106 may display a screen for installation of the print extension application 402 based on pressing of the detailed setting button 713 illustrated in FIG. 7C in the state where the print extension application 402 is not installed in the terminal 106. This makes it possible to install the print extension application 402 before performing the detailed setting even in the case where the print extension application 402 is not previously installed in the terminal 106.

In the above-described exemplary embodiments, both the document creation application device token and the print extension application device token are registered with the account database 5000 in order to enable the cloud service 500 to give notification to the document creation application 403 and the print extension application 402. In a case where the application to be notified by the cloud service 500 is either the document creation application 403 or the print extension application 402, the token of only the application to be notified may be registered with the account database 5000. For example, in a case where the cloud service 500 notifies only the print extension application 402, the processing in and after step S807 in FIG. 8 may be performed without performing the processing in steps S801 to S806. In this case, only the print extension application device token 5003 is registered with the account database 5000.

Exemplary embodiments of the present disclosure are implemented by supplying software (program) realizing the functions of the above-described exemplary embodiments to a system or an apparatus via a network or various kinds of storage media, and causing a computer (or CPU, microprocessor unit (MPU), etc.) of the system or the apparatus to read out and execute the program. In this case, the computer program and the storage medium storing the computer program configure exemplary embodiments of the present disclosure.

A server device according to some embodiments can provide a print setting screen adapted to an image forming apparatus to be used for printing in a print service that is generally usable irrespective of a model and a vendor of the image forming apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-151408, filed Aug. 21, 2019, which is hereby incorporated by reference herein in its entirety.

What is claimed is:

1. An information processing apparatus on which a file generating application and a print setting application are installed, wherein the file generating application is to be used for providing image data included in print data that is to be printed by an image forming apparatus and the print setting application is to be used for displaying a print setting screen and providing print setting values included in the print data, the information processing apparatus comprising a controller including a processor, the controller configured to:

execute a predetermined process based on a predetermined user instruction received via a screen displayed by the file generating application, wherein the execution of the predetermined process triggers an obtainment of information about the image forming apparatus via a network by the print setting application;

display the print setting screen based on the obtained information, wherein the displayed print setting screen is used for receiving user instructions for setting the print setting values; and transmit the print data to be printed by the image forming apparatus.

2. The information processing apparatus according to claim 1, wherein the print setting application obtains the information about the image forming apparatus from a server system that is to be a destination of the print data.

3. The information processing apparatus according to claim 1, wherein the screen displayed by the file generating application is used for selecting the image forming apparatus to be used for printing, and wherein the print setting application obtains the information about the image forming apparatus that has been selected via the screen displayed by the file generating application.

4. The information processing apparatus according to claim 1, wherein the screen is a screen for setting copies, and wherein the print setting screen displayed by the print setting application is to be used for setting a print setting value that is not able to be set via the screen displayed by the file generating application.

5. The information processing apparatus according to claim 2, wherein the print setting application transmits an obtaining request for obtaining the information about the image forming apparatus to the server system and obtains the information about the image forming apparatus from the server system as a response to the transmitted request.

6. The information processing apparatus according to claim 5, wherein the information about the image forming apparatus has been registered to the server system before a transmission of the obtaining request.

7. The information processing apparatus according to claim 1, wherein the controller obtains, based on a selection of the image forming apparatus, other information about the image forming apparatus, wherein the information obtained by the print setting application is not included in the other information.

8. The information processing apparatus according to claim 1, wherein the predetermined process is a process for displaying the print setting screen.

9. A non-transitory storage medium storing a print setting application for providing print setting values to be included in print data that includes image data provided by a file generating application and that is to be printed by an image forming apparatus, wherein the print setting application when executed by an information processing apparatus having the file generating application, causes the information processing apparatus to perform operations comprising:

obtaining information about the image forming apparatus via a network, wherein the obtainment is triggered by a predetermined user instruction via a screen displayed by the file generating application; and displaying a print setting screen based on the obtained information, wherein the displayed print setting screen is used for receiving user instructions for setting the print setting values.

10. The non-transitory storage medium storing the print setting application according to claim 9, wherein the screen displayed by the file generating application is used for selecting the image forming apparatus to be used for printing and the print setting application obtains the information about the selected image forming apparatus.

11. The non-transitory storage medium storing the print setting application according to claim 9, wherein the screen displayed by the file generation application is a screen for setting copies, and wherein the print setting screen displayed by the print setting application is to be used for setting a print setting value that is not able to be set via the screen displayed by the file generating application.

12. The non-transitory storage medium storing the print setting application according to claim 9, wherein the print setting application obtains the information from a server system.

13. The non-transitory storage medium storing the print setting application according to claim 12, wherein the print data is transmitted to the server system and the image forming apparatus receives the transmitted print data from the server system.

14. The non-transitory storage medium storing the print setting application according to claim 12, wherein the print setting application transmits a obtaining request for obtaining the information about the image forming apparatus, and wherein the information about the image forming apparatus is registered to the server system before the transmission of the obtaining request.

15. The non-transitory storage medium storing the print setting application according to claim 9, wherein the obtainment is triggered by execution of a predetermined process that is triggered by the predetermined user instruction via the displayed screen.

16. The non-transitory storage medium storing the print setting application according to claim 9, wherein the print setting application receives the user instruction for setting the print setting values, sets the print setting values and provides the set print setting values to the file generating application.

17. The non-transitory storage medium storing the print setting application according to claim 9, wherein the obtainment is executed automatically in a case that the predetermined user instruction is received.

18. The non-transitory storage medium storing the print setting application according to claim 17, wherein the obtainment is executed without any further user instruction in a case that the predetermined user instruction is received.

19. The non-transitory storage medium storing the print setting application according to claim 9, wherein a predetermined process is a process for displaying the print setting screen.

20. A control method performed by an information processing apparatus including a file generating application for providing image data included in print data that is to be printed by an image forming apparatus and a print setting application for displaying a print setting screen and providing print setting values to be included in the print data, the control method comprising:

obtaining information about the image forming apparatus via a network by the print setting application, wherein the obtainment is triggered by a predetermined user instruction via a screen displayed by the file generating application; and displaying the print setting screen based on the obtained information, wherein the displayed print setting screen is used for receiving user instructions for setting the print setting values.

21. The control method according to claim 20, wherein the screen displayed by the file generating application is used for selecting the image forming apparatus to be used for printing and the print setting application obtains the information about the selected image forming apparatus.

22. The control method according to claim 20, wherein the screen displayed by the file generating application is a screen for setting copies, and
wherein the print setting screen displayed by the print setting application is to be used for setting a print setting value that is not able to be set via the screen displayed by the file generating application.

23. The control method according to claim 20, wherein the print setting application obtains the information from a server system.

24. The control method according to claim 23, wherein the print data is transmitted to the server system and the image forming apparatus receives the transmitted print data from the server system.

25. The control method according to claim 23, wherein the print setting application transmits a obtaining request for obtaining the information about the image forming apparatus, and wherein the information about the image forming apparatus is registered to the server system before the transmission of the obtaining request.

26. The control method according to claim 20, wherein the obtainment is triggered by execution of the predetermined process that is triggered by the predetermined user instruction via the screen displayed by the file generating application.

27. The control method according to claim 20, wherein the print setting application receives the user instruction for setting the print setting values, sets the print setting values and provides the set print setting values to the file generating application.

28. The control method according to claim 20, wherein the obtainment is executed automatically in a case that the predetermined user instruction is received.

29. The control method according to claim 28, wherein the obtainment is executed without any further user instruction in a case that the predetermined user instruction is received.

30. An information processing apparatus comprising a controller including a processor, the controller configured to:
execute a file generating application for providing image data to be included in print data to be printed by an image forming apparatus; and
execute a print setting application for providing print setting values to be included in the print data, wherein the print setting application executed by the controller obtains information about the image forming apparatus via a network, wherein the obtainment is triggered by a predetermined user instruction via a screen displayed by the file generating application, and
displays a print setting screen based on the obtained information, wherein the displayed print setting screen is used for receiving user instructions for setting print setting values.

31. The information processing apparatus according to claim 30, wherein the screen displayed by the file generating application is used for selecting the image forming apparatus to be used for printing and the controller obtains the information about the selected image forming apparatus.

32. The information processing apparatus according to claim 30, wherein the screen displayed by the file generating application is a screen for setting copies, and
wherein the print setting screen is to be used for setting a print setting value that is not able to be set via the screen displayed by the file generating application.

33. The information processing apparatus according to claim 30, wherein the controller obtains the information from a server system and wherein the print data is transmitted to the server system.

34. The information processing apparatus according to claim 30, wherein the obtainment is triggered by execution of a predetermined process that is triggered by the predetermined user instruction.

35. The information processing apparatus according to claim 30, wherein the obtainment is executed automatically in a case that the predetermined user instruction is received.

36. The information processing apparatus according to claim 35, wherein the obtainment is executed without any further user instruction in a case that the predetermined user instruction is received.

37. The information processing apparatus according to claim 1, wherein the obtainment is executed before the print setting screen based on the obtained information is displayed.

38. The non-transitory storage medium storing the print setting application according to claim 9, wherein the obtainment is executed before the print setting screen based on the obtained information is displayed.

39. The control method according to claim 20, wherein the obtainment is executed before the print setting screen based on the obtained information is displayed.

* * * * *